United States Patent [19]
Sullivan et al.

[11] Patent Number: 5,184,331
[45] Date of Patent: Feb. 2, 1993

[54] TRANSDUCER CIRCUIT FOR REMOVING REACTIVE COMPONENT OF TRANSDUCER SIGNAL

[75] Inventors: Michael J. Sullivan, Oakdale; Douglas G. Dussault, East Lyme, both of Conn.

[73] Assignee: The United States of America as represented by the Secretary of the Navy, Washington, D.C.

[21] Appl. No.: 891,120

[22] Filed: Jun. 1, 1992

[51] Int. Cl.⁵ .............................................. H04B 1/06
[52] U.S. Cl. .................................. 367/135; 333/17.1; 367/901
[58] Field of Search ................... 333/17.1; 334/71, 74; 330/302, 306; 367/13, 131, 135, 900, 901; 455/122, 123, 125

[56] References Cited

U.S. PATENT DOCUMENTS 3,351,860  11/1967  Wolff .................................... 455/122
3,919,644  11/1975  Smolka ................................ 455/123

Primary Examiner—Paul Gensler
Attorney, Agent, or Firm—Michael J. McGowan; Prithvi C. Lall; Michael F. Oglo

[57] ABSTRACT

Transducer circuit, including a tuning inductor for removing the reactive component from the signal of an acoustic transducer; the inductance varies with frequency, thus permitting the transducer-tuning inductor to present a non-reactive load to the an amplifier over a broad operating frequency.

6 Claims, 2 Drawing Sheets

TRANSDUCER CIRCUIT FOR REMOVING REACTIVE COMPONENT OF TRANSDUCER SIGNAL

STATEMENT OF GOVERNMENT INTEREST

The invention described herein may be manufactured and used by or for the Government of the United States of America for government purposes without the payment of any royalties thereon or therefor.

BACKGROUND OF THE INVENTION (1) Field of the invention

The present invention relates to a transducer circuit for use with a power amplifier and, more particularly, to an apparatus for maintaining the transducer tuned to the amplifier over a wide range of frequencies.

(2) Description of the Prior Art

It has long been recognized in the electrical engineering field that full advantage of the amplification available from a power amplifier can be obtained only when the input alternating current signal is tuned to the amplifier, i.e., contains no reactive component. Some loads, however, have substantial reactive component. The problem is particularly acute in the case of the acoustic transducers used in sonar apparatus. In the past, it has been the practice to insert a fixed inductance device between the transducer and the amplifier to remove the reactive component from the signal. This system would be adequate if the signal from the transducer remained at a single frequency and, therefore, the signal had an unvarying reactive component. However, such is not the case, since the frequency of the signal generated by such a transducer may vary over a considerable range. Above and below resonance, the reactance is incorrect, thus requiring the amplifier to output more voltage times current than would be required if the reactive component of the load were tuned out. In other words, the use of a fixed inductor, when the signal varies from the frequency for which the fixed inductance was intended, results in a substantial reactive component remaining.

The power is equal to the voltage times the current multiplied by the cosine of the phase angle, while the amplifier must provide the voltage times the current, irrespective of the phase shift. It, therefore, becomes necessary to design the amplifier grossly oversize, if the transducer is to be operated over a wide frequency range.

Some examples of attempts to solve problems of this type are shown in various U.S. patents. The patent of Henze et. al., U.S. Pat. No. 4,930,063 discloses a voltage regulator particularly adapted to A.C. distributed power systems requiring independent voltage regulation at a plurality of frequency responsive power supply modules energized by a power source at a common alternating frequency, which is provided by resonant tuning of the regulator circuit. The patent of Yamamoto et. al., U.S. Pat. No. 4,749,974 shows a double-tuned circuit provided that is of the type using a primary tuning circuit, including first and second resonance coils connected in series. The patent of Slye et. al., U.S. Pat. No. 4,737,116 has to do with an impedance-matching block for multi-pin connectors. The patent of Aoki et. al., U.S. Pat. No. 4,596,044 discloses a combination UHF/VHF tuner with a switching diode placed in series with a VHF high-range peaking coil, so that the coil forms a parallel resonance peaking circuit when high-range VHF signals are received, so that the coil then acts as a series impedance-matching element when a UHF/IF signal is coupled from a UHF mixer stage. The patent of Torres et. al., U.S. Pat. No. 4,339,827 shows a tuning circuitry for a VHF television antenna, which tunes such an antenna for signals that correspond to the TV channel selected and couples those signals to the tuning system of the television receiver. The patent of Umemura et. al., U.S. Pat. No. 4,144,512 describes an AFC voltage superimposing circuit for an electronic tuner, using a plurality of varactors as a tuning element, comprising a plurality of resistors for superimposing an AFC voltage on a tuning voltage and bypass circuit. The patent of Garskamp, U.S. Pat. No. 4,074,216 discloses a receiver tuning circuit in which, without operation of extra switches, a change-over can be made from tuning; the tuning can be made by means of a continuously-varying tuning voltage. The patent of Minami, U.S. Pat. No. 4,020,420 discloses an electronic channel selector, including a plurality of variable resistors, switches, and a voltage memory circuit. The patent of Scharla-Nielsen et. al., U.S. Pat. No. 2,925,477 shows an ultra-high frequency amplifier using input and output tank configurations and coupling elements. The patent of Cushman et. al., U.S. Pat. No. 2,886,788 discloses tuned elements which are used in ultra-high frequency transmitting and receiving equipment. None of these devices can solve the problems addressed by the present invention. These and other difficulties experienced with the prior art devices have been obviated in a novel manner by the present invention.

SUMMARY OF THE INVENTION

Accordingly, it is a general purpose and object of the present invention to provide a means for providing a circuit including a tuning inductor for use with an acoustic transducer that automatically varies inductance with frequency to keep the transducer tuned over a wide operating frequency.

A still further object is the provision of a transducer circuit which is simple and rugged in design, which is capable of being easily manufactured from readily-available materials, and which is capable of a long life of useful service with a minimum of maintenance.

A further object of the invention is to provide a circuit with an amplifier and a transducer in which the amplifier can be designed at a minimum size, while still operating effectively with variations in frequency of the signal from the transducer.

These objects are accomplished with the present invention by providing a tuning inductor for tuning out the reactive component of the signal from an acoustic transducer, wherein the inductance of the inductor varies with frequency, thus permitting the transducer-tuning inductor to present a non-reactive load to a power amplifier over a broad range of operating frequencies.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
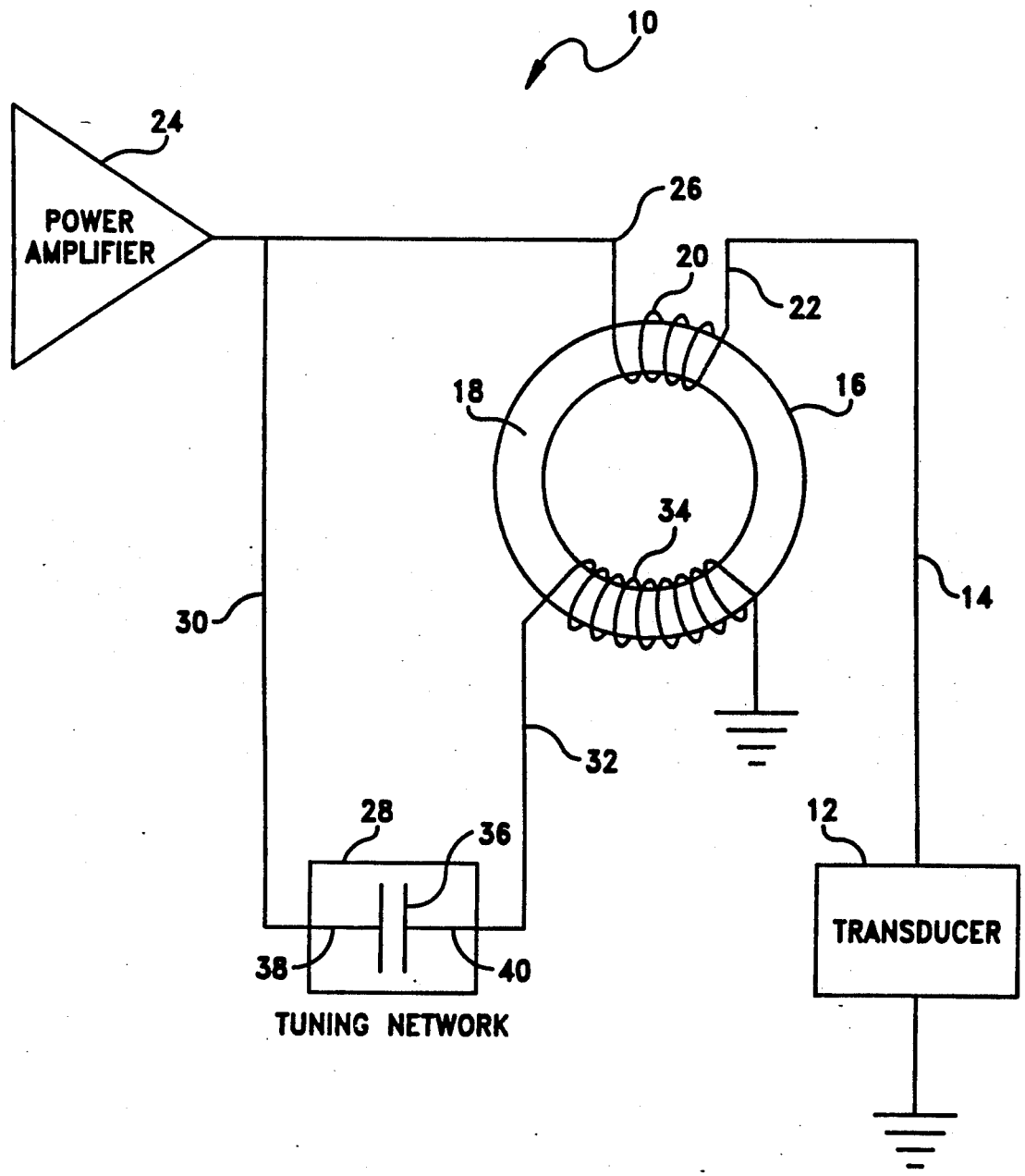
FIG. 1 is an electrical schematic view of a transducer circuit incorporating the principles of the present invention.

Referring to FIG. 1, wherein are shown the general features of the invention, the transducer circuit, indicated generally by the reference numeral 10, is shown as having a a transducer 12 with an output lead 14 carrying an alternating current signal which has a substantial reactive component that varies with frequency. An inductor 16 is provided having a core 18 carrying a primary winding 20, one end 22 of which is connected to the said output lead 14 of the transducer. The other end 26 of the primary winding is connected to a power amplifier 24.

A control circuit 28 is provided having an input lead 30 that is connected to the said other end 26 of the primary winding. A secondary winding 34 is carried on the inductor core 18 to which the control circuit output lead 32 is connected, which winding operates in "bucking" relationship to the primary winding 20, so that the power amplifier is tuned to the transducer over a wide range of frequencies.

Figure 2:
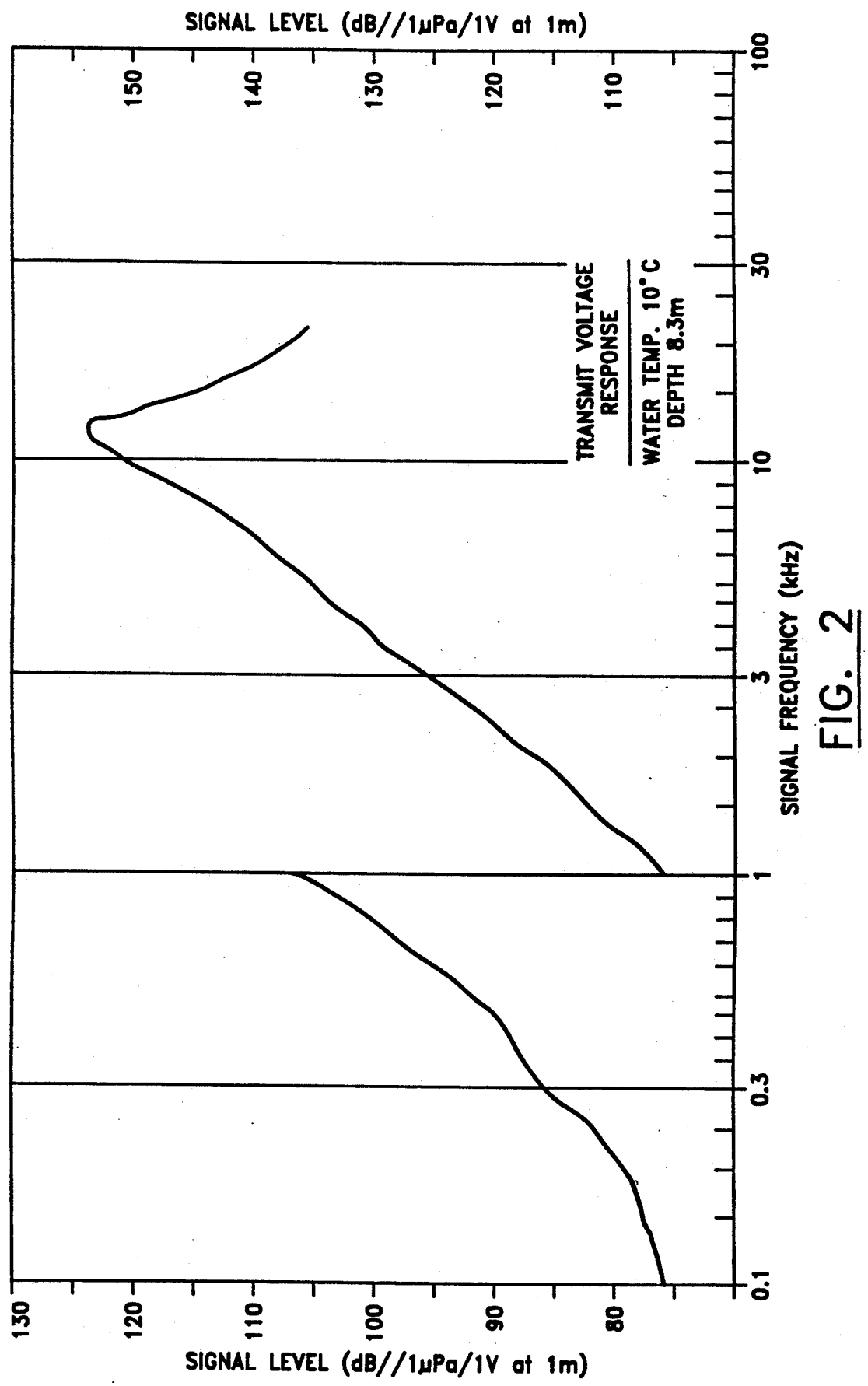
FIG. 2 is a graphical representation of the response of an acoustical transducer forming part of the invention.

In the preferred embodiment of the invention, the inductor 16 has a toroidal core 18 with the primary and secondary windings 20, 34 on the torus. The windings are wound in opposite directions on the core, so that the inductance of the inductor 16 caused by current in the primary winding 20 is reduced by the inductance caused by current in the secondary winding. The control circuit 28 includes a capacitor 36 whose input lead 38 receives an alternating current signal from the said other end 26 of the primary winding. Its output lead 40 is connected by the output lead 32 of the control circuit to the secondary winding, so that the reactive component of the transducer signal is removed over a wide range of frequencies. The secondary winding 34 has a substantially greater number of turns than the primary winding 20, so that the amount of the said signal removed from the said other end of the primary winding can be very small. In general, then, the, control circuit 28 consists of a passive network which provides to the secondary winding the amount of current needed at a given frequency to tune out the reactive component of the transducer signal. In a practical embodiment of the invention, the transducer 12 was an ITC Model 1007 whose response is shown in FIG. 2. The amplifier 24 was a 30-watt MacIntosh amplifier and the inductor 16 was custom made. 1

The operation and the advantages of the present invention will now be readily understood in view of the above description The transducer 12, which may be part of a sonar system, generates an alternating current signal. This "signal has a substantial reactive component that is in the form of a captive reactance. This reactive component varies with frequency, so that a fixed inductance will cancel out that component completely only at one frequency. In such a case, of course, the size of the amplifier must be selected to give the desired power at the worst case situation, i.e., when the remaining component in the signal is the largest.

In the present invention, the signal leaves the transducer 12 on the lead 14 and enters the primary winding 20 at its first end 22. Depending on the inductance (inductive reactance) of the inductor 16, the signal leaving the winding at its end 26 and passing to the power amplifier 24 will have a certain amount of its reactive component removed. Ideally, the power (voltage times current times the cosine of the phase shift angle) will be the same as the rated power (voltage times the current) of the amplifier. In that case, the amplifier will produce its maximum power.

With the present invention, a portion of the signal leaving the winding 20 on its end 26 is tapped by the lead 30 and passes to the control circuit 28. It is the nature of that circuit, including the capacitor 36, to produce current that is proportional in amount to the frequency of the alternating current signal entering it. This current passes through the lead 32 and the secondary winding 34 to ground. The current in the secondary winding 34 alternates in synchrony with the current in the primary winding 20, but in the opposite direction (bucking) on the toroidal core 18. While the current in the primary winding produces inductance in one direction, the current in the secondary products inductance in the other direction, so that the two inductances cancel one another. This leaves just enough inductance in the inductor to cancel the reactive component in the transducer signal.

Since the reactive components in the voltage/current relationship change in both windings, as frequency changes, they cancel one another by the desired amount, irrespective of the frequency, so that the load to the amplifier is always without a phase shift angle.

In light of the above, it is therefore understood that within the scope of the appended claims, the invention may be practiced otherwise than as specifically described.

What is claimed is:

1. A transducer circuit comprising:
   an acoustic transducer having an output lead carrying an alternating current signal having a substantial reactive component that varies with frequency;
   an inductor having a core with a primary winding, one end of which is connected to the said output lead;
   a power amplifier to which the other end of the inductor winding is connected;
   a control circuit having an input lead that is connected to the said other end of the primary winding; and
   a secondary winding on the inductor core to which the control circuit output lead is connected, which winding operates in bucking relationship to the primary winding, so that the power amplifier is tuned to the transducer over a wide range of frequencies.

2. A transducer circuit according to claim 1 wherein the inductor has a toroidal core with the primary and secondary windings located on opposite sides of the torus.

3. A transducer circuit according to claim 2 wherein the windings extend in opposite directions on the core, so that the inductance of the primary winding is reduced by current in the secondary winding.

4. A transducer circuit according to claim 1 wherein the control circuit includes a capacitor whose input lead receives an alternating current signal from the said other end of the primary winding and whose output lead is connected by the output lead of the control circuit to the secondary winding, so that the reactive component of the transducer signal is removed over a wide range of frequencies.

5. A transducer circuit according to claim 4 wherein the secondary winding has substantially greater number of turns than the primary winding, so that the amount of the said signal removed from the said other end of the primary winding is very small.

6. A transducer circuit according to claim 1 wherein the control circuit consists of a passive network which provides to the secondary winding the amount of current needed at a given frequency to tune out the reactive component of the transducer signal.

* * * * *